United States Patent
Eso (12)

(10) Patent No.: US 10,336,654 B2
(45) Date of Patent: Jul. 2, 2019

(54) CEMENTED CARBIDE WITH COBALT-MOLYBDENUM ALLOY BINDER

(71) Applicant: Kennametal Inc., Latrobe, PA (US)

(72) Inventor: Oladapo Eso, Harvest, AL (US)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 14/839,214

(22) Filed: Aug. 28, 2015

(65) Prior Publication Data

US 2017/0057878 A1    Mar. 2, 2017

(51) Int. Cl.

| | | |
|---|---|---|
| *B24D 3/00* | (2006.01) | |
| *C04B 35/56* | (2006.01) | |
| *B24D 3/06* | (2006.01) | |
| *B24D 3/02* | (2006.01) | |
| *B24D 11/00* | (2006.01) | |
| *B24D 18/00* | (2006.01) | |
| *C09K 3/14* | (2006.01) | |

(52) U.S. Cl.
CPC ............ *C04B 35/5626* (2013.01); *B24D 3/06* (2013.01); *C04B 2235/3847* (2013.01); *C04B 2235/405* (2013.01); *C04B 2235/408* (2013.01); *C04B 2235/427* (2013.01)

(58) Field of Classification Search
USPC .......................................... 51/293, 307, 309
See application file for complete search history.

(56) References Cited

U.S. PATENT DOCUMENTS

| | | | |
|---|---|---|---|
| 2,765,227 A | 10/1956 | Goetzel et al. | |
| 3,322,513 A | 5/1967 | Corbett | |
| 3,981,062 A | 9/1976 | Moskowitz et al. | |
| 3,999,954 A | 12/1976 | Kolaska et al. | |
| 5,305,840 A | 4/1994 | Liang et al. | |
| 5,902,942 A | 5/1999 | Maderud et al. | |
| 6,514,456 B1 * | 2/2003 | Lackner ............... | B23H 9/00 |
| | | | 148/423 |
| 9,005,329 B2 | 4/2015 | Norgren et al. | |
| 2002/0112564 A1 | 8/2002 | Leidel et al. | |

(Continued)

FOREIGN PATENT DOCUMENTS

| | | |
|---|---|---|
| GB | 715704 | 9/1954 |
| GB | 1309634 | 3/1973 |
| WO | 2006/080888 A1 | 8/2006 |

OTHER PUBLICATIONS

Davis, J.R.,Tool Materials, ASM Specialty Handbook, ASM International, Materials Park, OH (1995) p. 49.

(Continued)

*Primary Examiner* — James E McDonough
(74) *Attorney, Agent, or Firm* — Larry R. Meenan

(57) ABSTRACT

In one aspect, sintered cemented carbide compositions are described herein exhibiting desirable wear resistance without deleterious losses in fracture toughness. Such cemented carbide compositions can be employed as tooling in a variety of applications including earth boring and mining operations as well as machining various metals and alloys. For example, a sintered cemented carbide composition described herein comprises a hard particle phase including tungsten carbide and a cobalt-based metallic binder comprising a cubic cobalt-molybdenum solid solution phase.

23 Claims, 9 Drawing Sheets

(56) References Cited

U.S. PATENT DOCUMENTS

| | | |
|---|---|---|
| 2005/0072269 A1* | 4/2005 | Banerjee ................. C22C 29/08 |
| | | 75/240 |
| 2006/0051618 A1 | 3/2006 | Festeau et al. |
| 2006/0131081 A1 | 6/2006 | Mirchandani et al. |
| 2007/0251732 A1 | 11/2007 | Mirchandani et al. |
| 2008/0196318 A1 | 8/2008 | Bost et al. |
| 2008/0226943 A1 | 9/2008 | Fang et al. |
| 2009/0293672 A1 | 12/2009 | Mirchandani et al. |
| 2011/0052931 A1 | 3/2011 | Morton et al. |
| 2013/0105231 A1 | 5/2013 | Oakes et al. |
| 2014/0298728 A1 | 10/2014 | Keshavan |

OTHER PUBLICATIONS

Davis, D.G., The Hexagonal Close Packed Phase Stability in the Cobalt-Molybdenum System: Further Confirmation of the Brewer-Engel Theory, Lawrence Berkeley National Laboratory, Aug. 1, 1981, 37 pages.

\* cited by examiner

CEMENTED CARBIDE WITH COBALT-MOLYBDENUM ALLOY BINDER

FIELD

The present invention relates to sintered cemented carbide compositions and, in particular, to sintered cemented carbide compositions employing cobalt-molybdenum alloy binder.

BACKGROUND

Cutting tools comprising cemented carbide bodies have been used in both coated and uncoated conditions for a variety of applications including earth boring and mining operations as well as machining various metals and alloys. Increasing cutting tool resistance to wear and failure modes, including fracture and chipping, remains an intense area of research and development. To that end, significant resources have been assigned to the development of wear resistant refractory coatings for cutting tools. TiC, TiCN, TiOCN, TiN and $Al_2O_3$, for example, have been applied to cemented carbides by chemical vapor deposition (CVD) as well as physical vapor deposition (PVD).

Moreover, properties of the underlying sintered cemented carbide substrate have been investigated. Cutting tool manufacturers have examined compositional changes to cemented carbide bodies and the resulting effects on cemented carbide properties including, but not limited to, hardness, wear resistance, fracture toughness, density and various magnetic properties. Enhancement of one cemented carbide property, however, often results in the concomitant deterioration of another cemented carbide property. For example, increasing wear resistance of a cemented carbide body can result in decreased fracture toughness of the body. Nevertheless, improvements to cemented carbide substrates are necessary to meet the evolving demands of earth boring and metal working applications, and a careful balance between competing properties is required when making compositional changes to cemented carbide bodies in efforts to provide cutting tools with improved performance.

SUMMARY

In one aspect, sintered cemented carbide compositions are described herein exhibiting desirable wear resistance without deleterious losses in fracture toughness. Such cemented carbide compositions can be employed as tooling in a variety of applications including earth boring and mining operations, wear parts as well as machining various metals and alloys. For example, a sintered cemented carbide composition described herein comprises a hard particle phase including tungsten carbide and a cobalt-based metallic binder comprising a cubic cobalt-molybdenum solid solution phase. In some embodiments, molybdenum is present in the cobalt-based metallic binder in an amount of 0.1 to 12 wt. %. Moreover, the cobalt-based metallic binder, in some embodiments, further comprises a cobalt-noble metal solid solution phase.

These and other embodiments are further described in the following detailed description.

DETAILED DESCRIPTION

Figure 2:
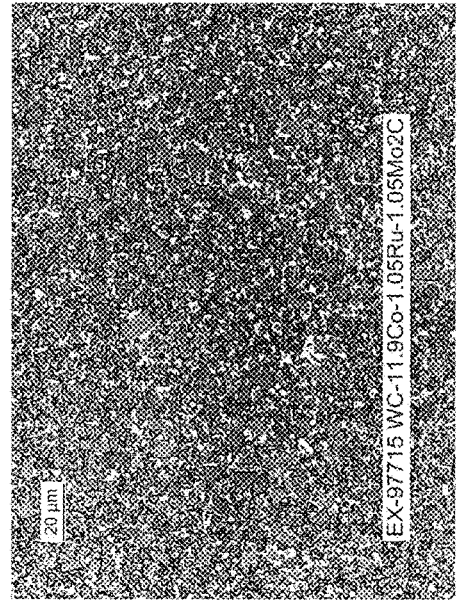
FIG. 2 is an optical micrograph of a sintered cemented carbide composition according to one embodiment described herein.
Figure 4:
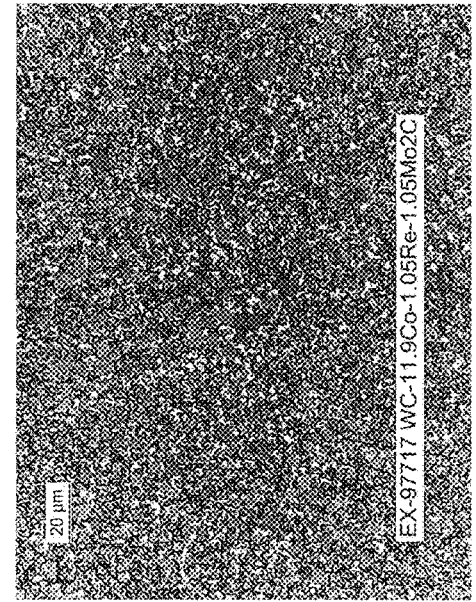
FIG. 4 is an optical micrograph of a sintered cemented carbide composition according to one embodiment described herein.
Figure 1:
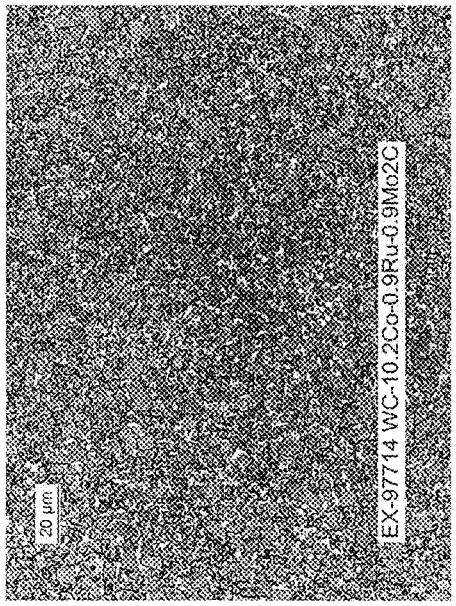
FIG. 1 is an optical micrograph of a sintered cemented carbide composition according to one embodiment described herein.
Figure 3:
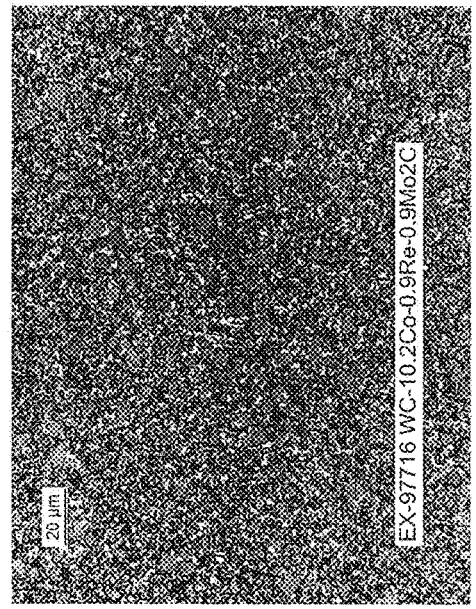
FIG. 3 is an optical micrograph of a sintered cemented carbide composition according to one embodiment described herein.
Figure 6:
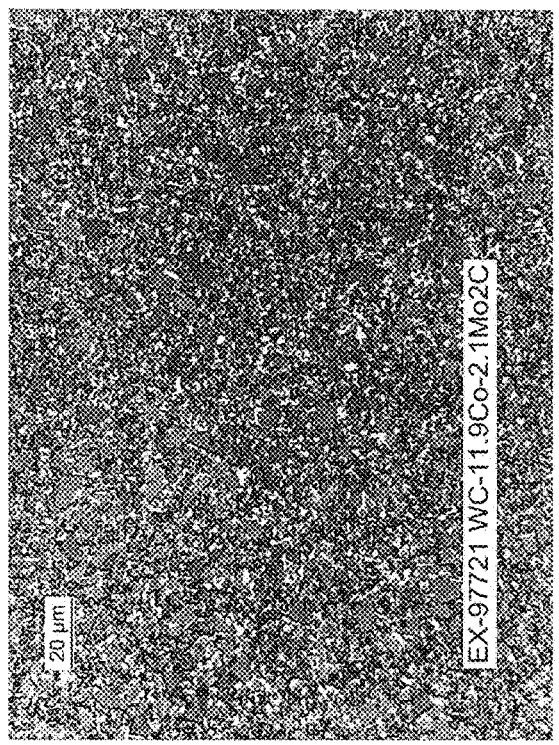
FIG. 6 is an optical micrograph of a sintered cemented carbide composition according to one embodiment described herein.
Figure 5:
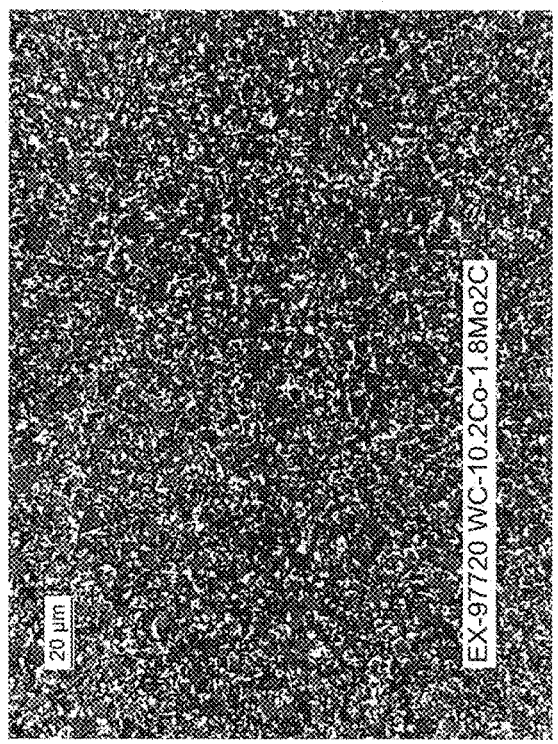
FIG. 5 is an optical micrograph of a sintered cemented carbide composition according to one embodiment described herein.
Figure 7:
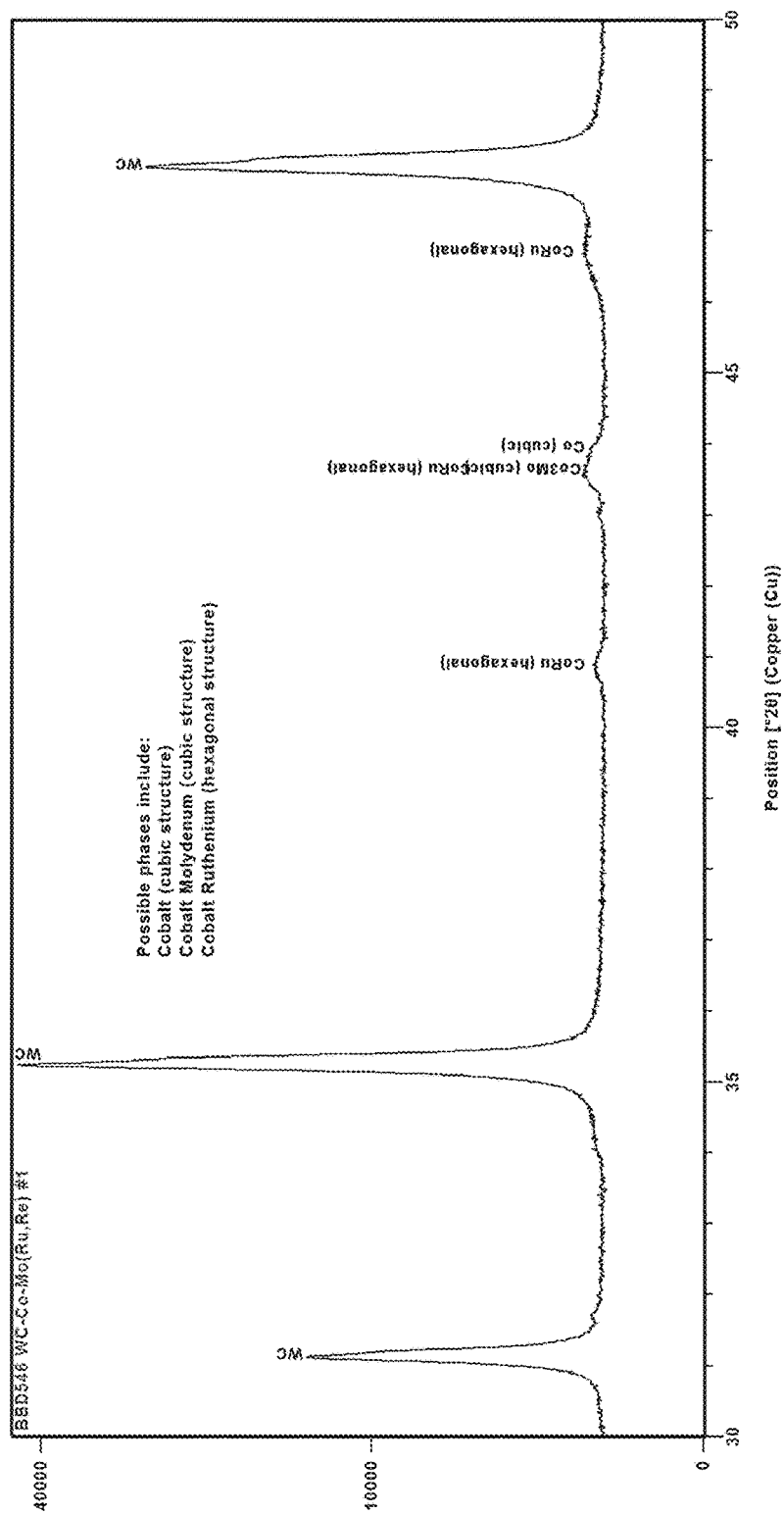
FIG. 7 is an X-ray diffractogram (XRD) of a sintered cemented carbide composition according to one embodiment described herein.
Figure 8:
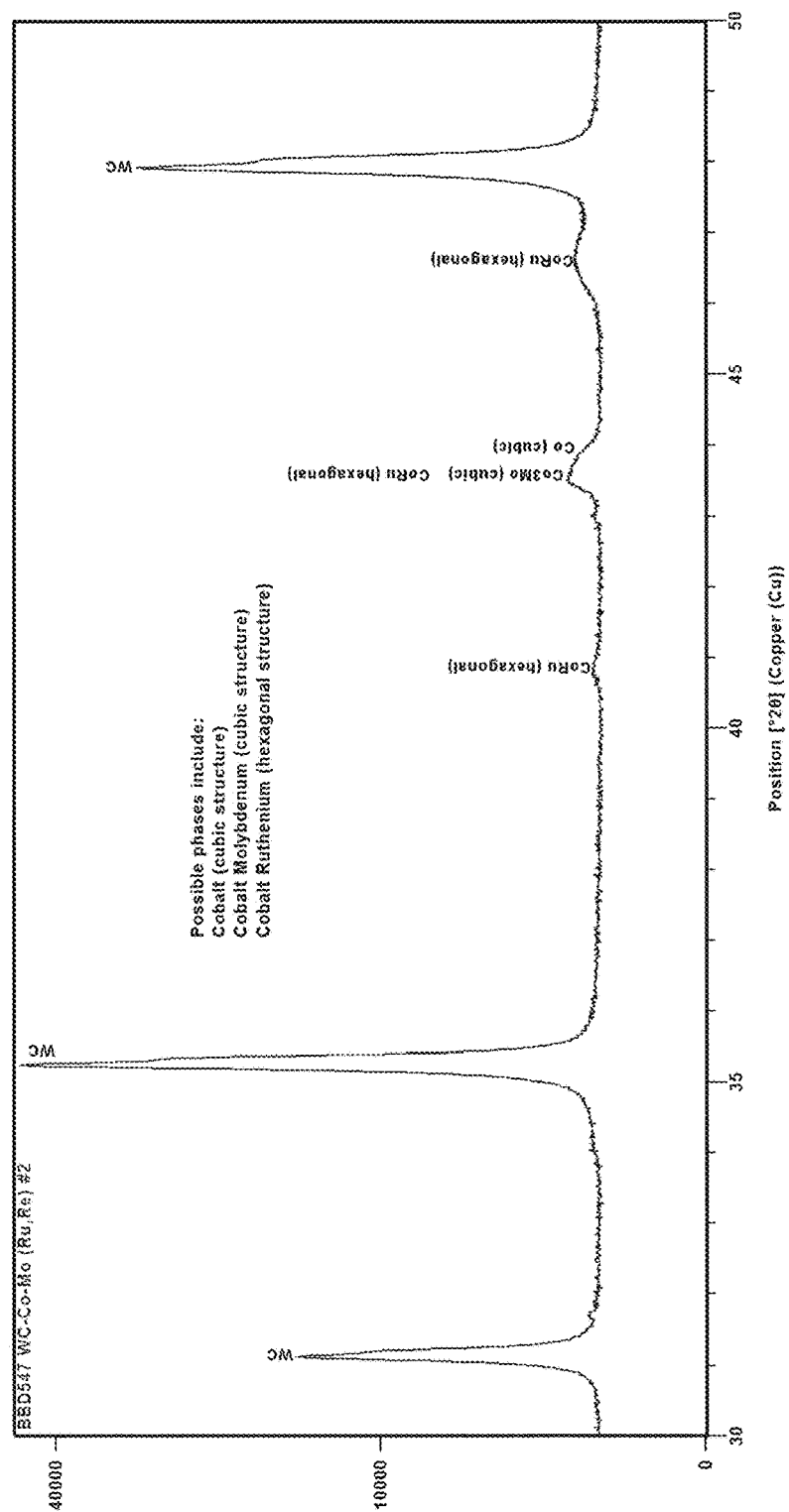
FIG. 8 is an XRD of a sintered cemented carbide composition according to one embodiment described herein.
Figure 9:
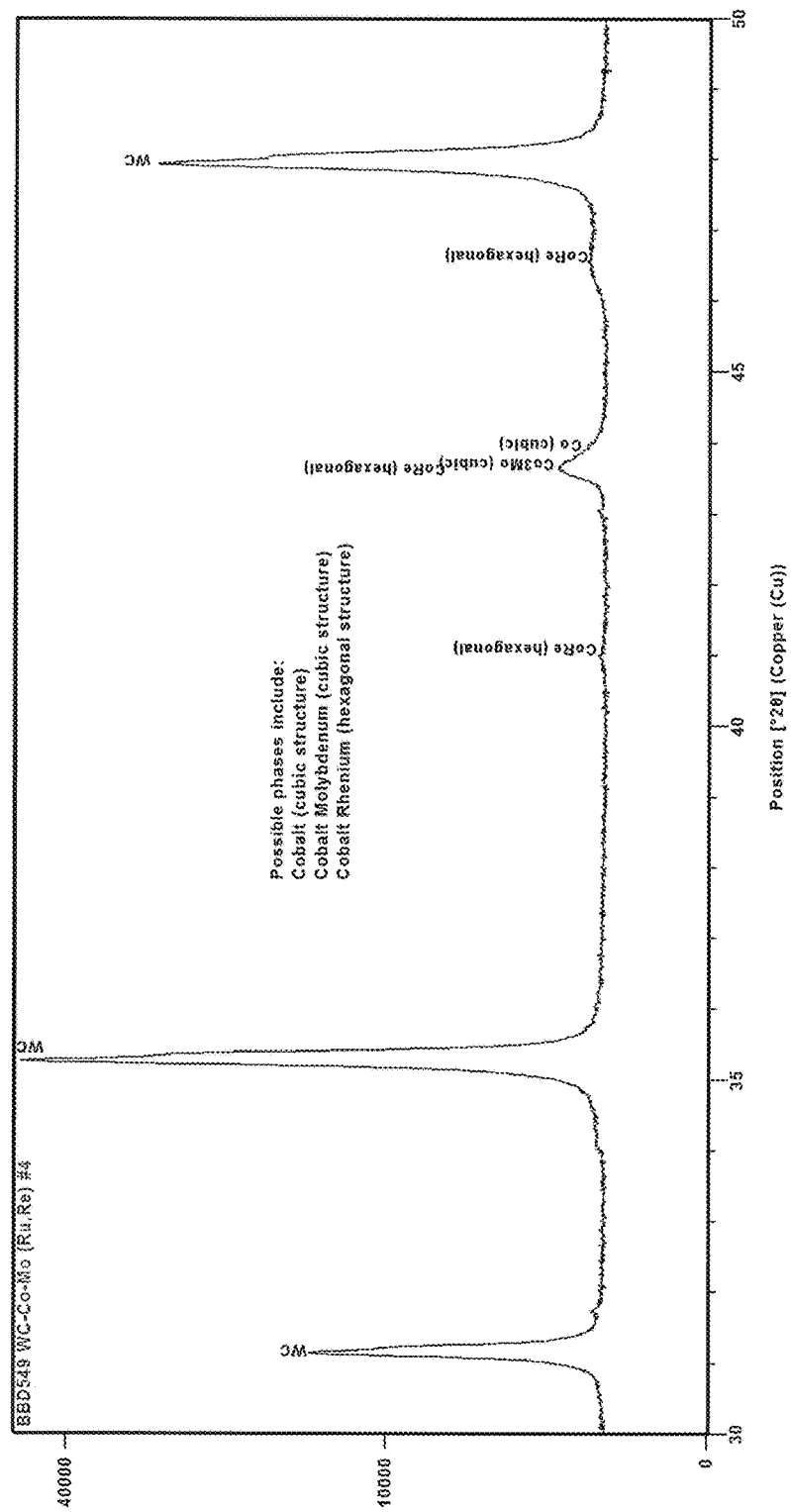
FIG. 9 is an XRD of a sintered cemented carbide composition according to one embodiment described herein.
Figure 10:
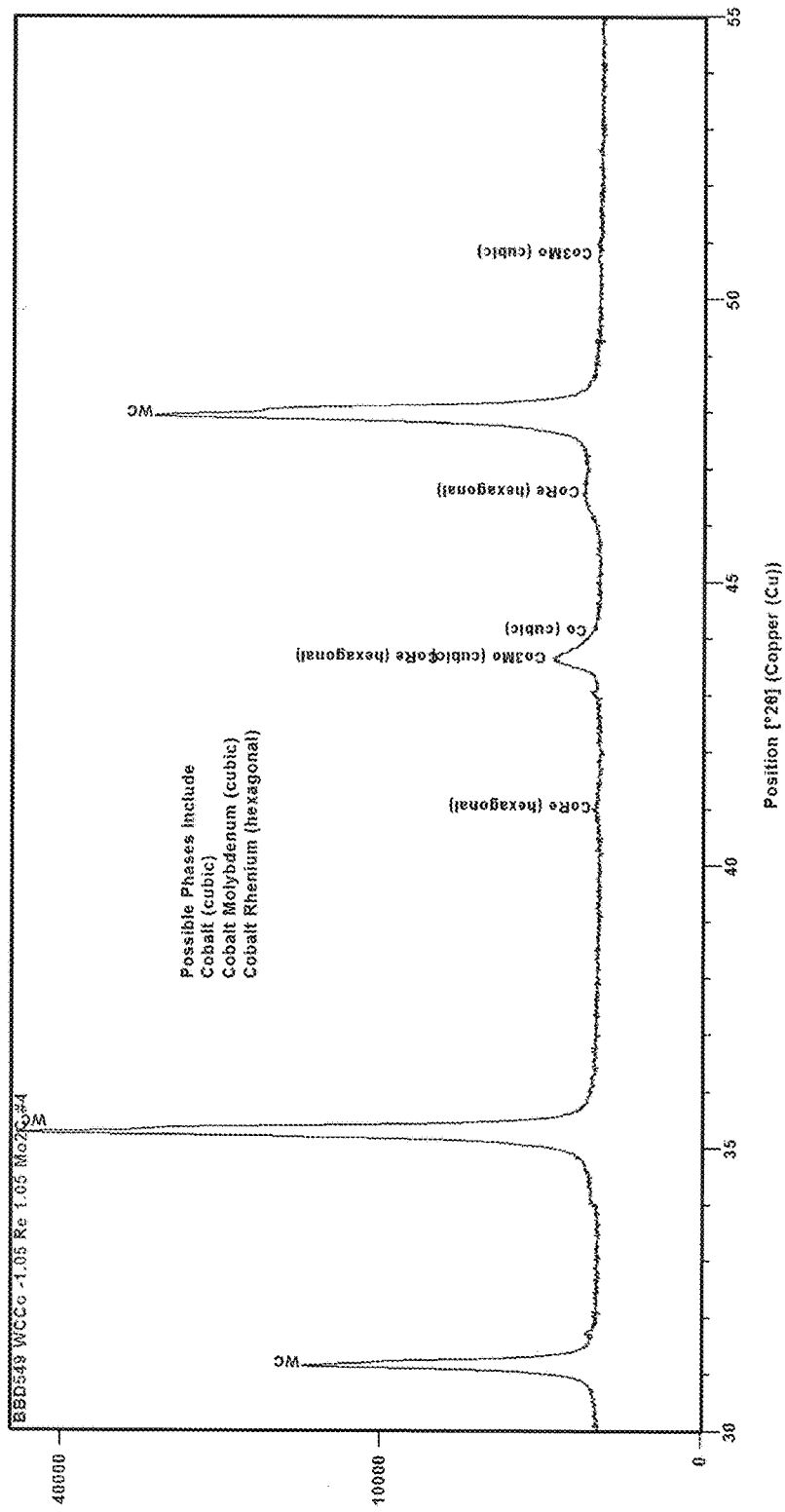
FIG. 10 is an XRD of a sintered cemented carbide composition according to one embodiment described herein.
Figure 11:
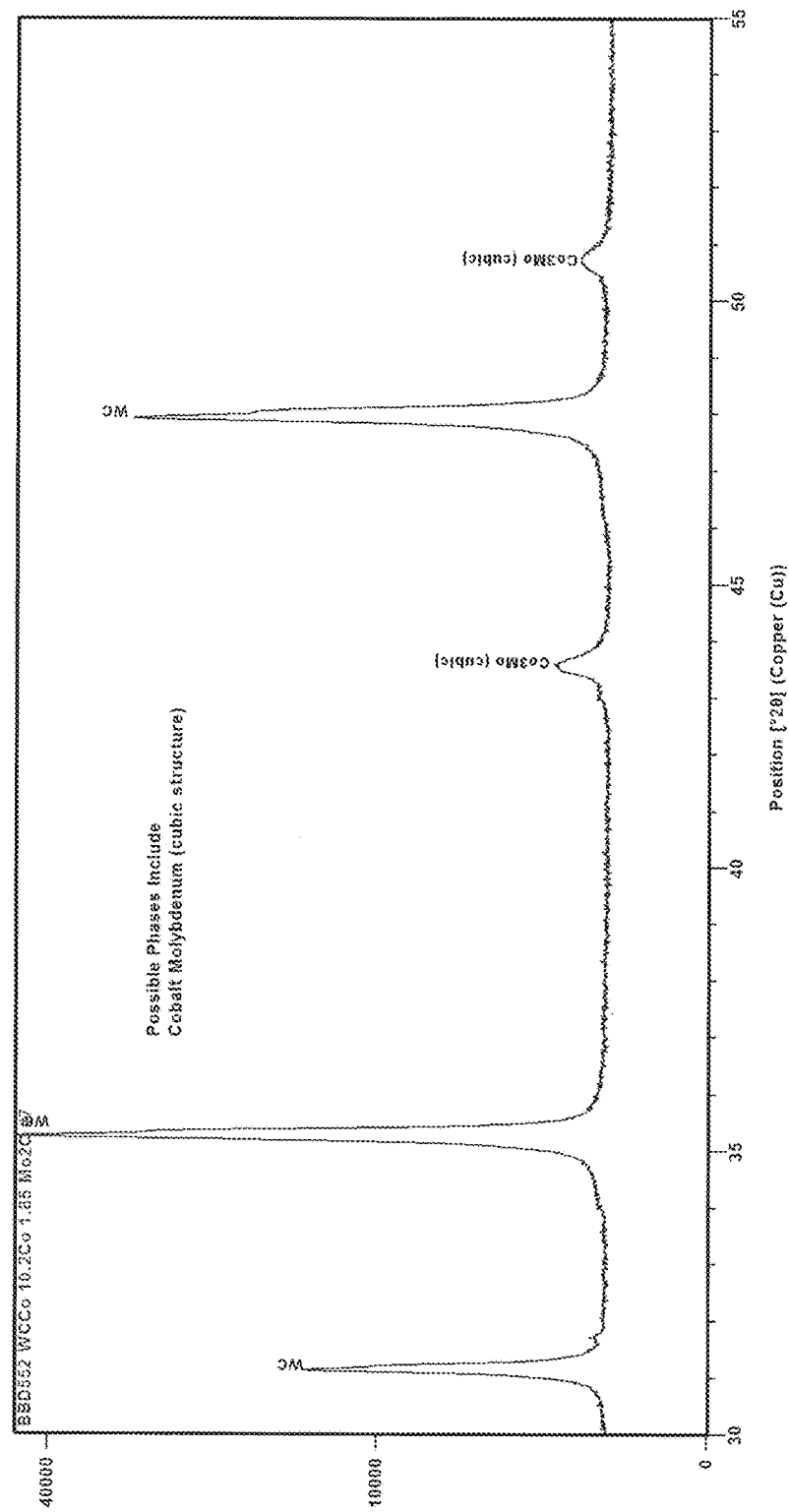
FIG. 11 is an XRD of a sintered cemented carbide composition according to one embodiment described herein.
Figure 12:
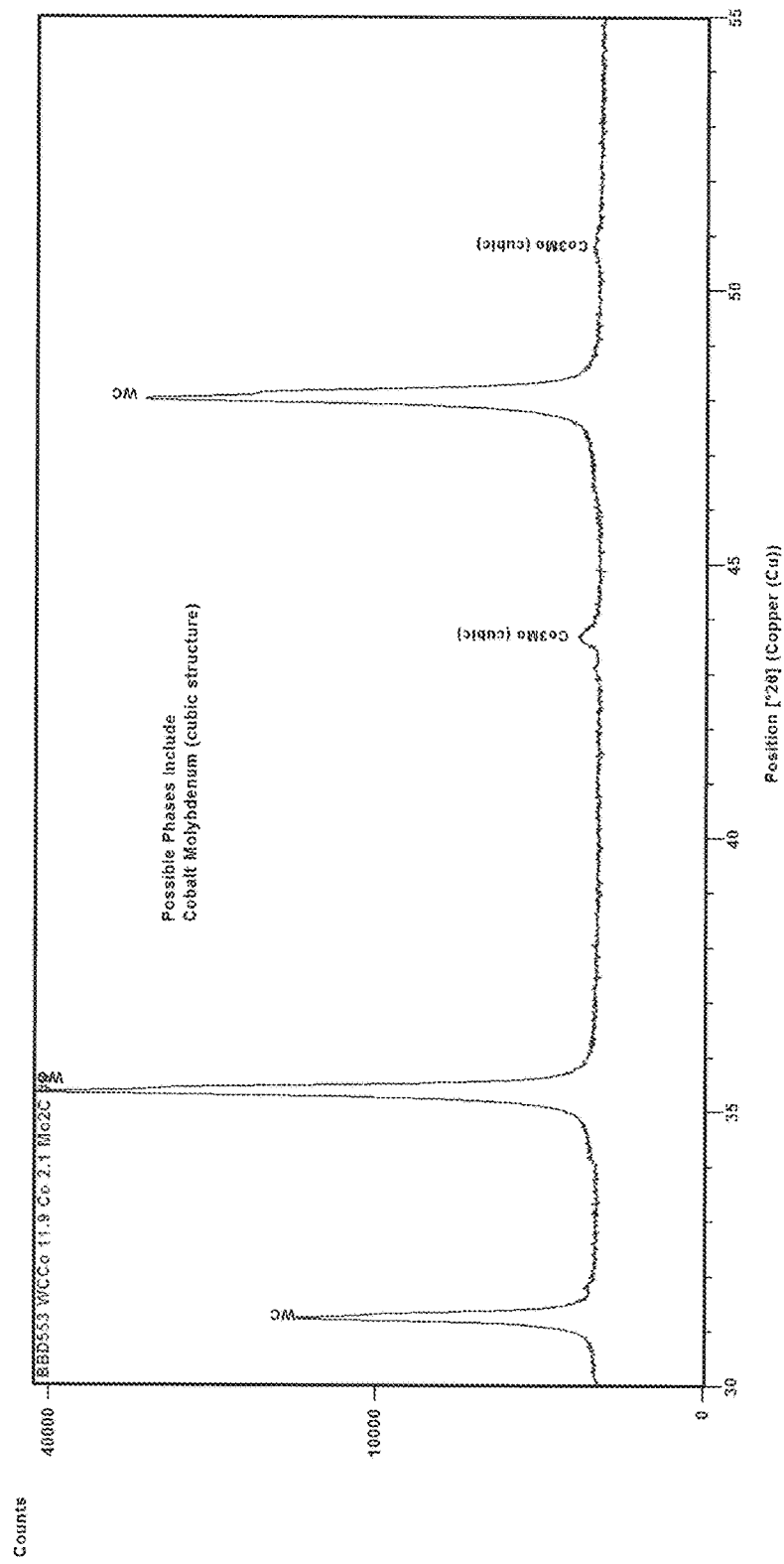
FIG. 12 is an XRD of a sintered cemented carbide composition according to one embodiment described herein.

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

Sintered cemented carbide compositions are described herein employing cobalt-based alloy binder including molybdenum content. In some embodiments, for example, a sintered cemented carbide composition comprises a hard particle phase including tungsten carbide and a cobalt-based metallic binder comprising a cubic cobalt-molybdenum solid solution phase.

Turning now to specific components, the hard particle phase can be present in the sintered cemented carbide composition in an amount of at least 70 weight percent. In some embodiments, the hard particle phase is present in an amount of at least 80 weight percent or at least 85 weight percent of the sintered cemented carbide composition. As described herein, the hard particle phase includes tungsten carbide (WC). Tungsten carbide of the hard particle phase can have any grain size not inconsistent with the objectives of the present invention. For example, the tungsten carbide can have an average grain size of 0.1 μm to 10 μm or 0.5 μm to 5 μm. Grain size can be determined according to the Linear Intercept procedure. In some embodiments, tungsten carbide constitutes the entire hard particle phase. Alternatively, the hard particle phase comprises one or more metal carbides, carbonitrides and/or nitrides in addition to tungsten carbide. In some embodiments, the hard particle phase comprises tungsten carbide and one or more carbides, carbonitrides and/or nitrides of titanium, niobium, vanadium, tantalum, chromium, zirconium and/or hafnium.

The sintered cemented carbide composition also comprises cobalt-based metallic binder. The cobalt-based metallic binder can be present in the sintered cemented carbide composition in any amount not inconsistent with the objectives of the present invention. The cobalt-based metallic binder can be present in an amount of 1 weight percent to 30 weight percent of the sintered cemented carbide composition. In some embodiments, cobalt-based metallic binder is present in the sintered cemented carbide composition in an amount selected from Table I.

TABLE I

| Amount of Co-based metallic binder (wt. %) |
| --- |
| 1-20 |
| 5-20 |
| 5-15 |
| 10-15 |
| 12-14 |

As described herein, the cobalt-based metallic binder comprises a cubic cobalt-molybdenum solid solution phase. Molybdenum forming the solid solution phase with the cobalt can generally be present in an amount of 0.1 to 12 weight percent of the metallic binder. In some embodiments, molybdenum in present in the metallic binder in an amount selected from Table II.

TABLE II

| Amount of Mo in Metallic Binder (wt. %) |
| --- |
| 0.5-10 |
| 1-9 |
| 2-8 |
| 5-10 |

The cobalt-based metallic binder, in some embodiments, further comprises a cobalt-noble metal solid solution phase. For example, noble metal of the cobalt-noble metal solid solution phase can be selected from the group consisting of ruthenium, rhenium, rhodium, platinum, palladium and combinations thereof. In contrast to the cubic crystalline structure of the cobalt-molybdenum solid solution phase, the cobalt-noble metal solid solution phase can exhibit a hexagonal crystalline structure. In some embodiments, noble metal content ranges from 0.1 to 10 weight percent or from 0.3 weight percent to 7 weight percent of the metallic binder.

As set forth in the examples below, sintered cemented carbide compositions can exhibit desirable wear resistance without deleterious losses to fracture toughness. Generally, sintered cemented carbide compositions described herein have a wear resistance of a 2 to 12 krevs/cm$^3$ according to ASTM B 611 Standard Test Method for Determining the High Stress Abrasion Resistance of Hard Materials. Moreover, sintered cemented carbide compositions described herein can also exhibit a fracture toughness generally ranging from 5 to 25 ksi(in)$^{1/2}$ according to ASTM B771 Standard Test Method for Short Rod Fracture Toughness of Cemented Carbides. In several specific embodiments, sintered cemented carbide compositions described herein have combinations of wear resistance and fracture toughness according to Table III.

TABLE III

| Sintered Cemented Carbide Properties | |
| --- | --- |
| Wear Resistance (krevs/cm$^3$) - ASTM B 611 | Fracture Toughness [ksi(in)$^{1/2}$] - ASTM B771 |
| 4-6 | 13-15 |
| 5-6 | 14-15 |
| 6-8 | 13-14 |
| 7-8 | 13.5-14 |

Additionally the sintered cemented carbide compositions can have density of 14-15 g/cm$^3$. For example the sintered cemented carbide can have density of 14.1-14.6 g/cm$^3$. Further, sintered cemented carbide compositions described herein can be free or substantially free of lower carbide phases, including eta phase [(CoW)C], W$_2$C and/or W$_3$C.

Sintered cemented carbide compositions described herein can be formed into a variety of tooling. In some embodiments, cutting inserts, bits and/or buttons of earth-boring or mining tooling and/or cutting elements are formed of the sintered cemented carbide compositions. Additionally, cutting inserts for machining metal or alloys can be formed of sintered cemented carbide compositions described herein. Further, interrupted cut tooling such as drills, end mills and/or milling inserts can be formed of sintered cemented carbide compositions described herein. In some embodiments, drills and/or end mills can be solid carbide, the carbide being sintered cemented carbide compositions described herein. Additionally, sintered cemented carbide compositions described herein can be combined with a polycrystalline diamond (PCD) component. For example, sintered cemented carbide compositions described herein can serve as a substrate or support to which PCD is sintered in a high temperature, high pressure process. In such embodiments, the layer of PCD can provide enhanced wear resistance leading to increased lifetimes of cutting elements and/or wear parts employing sintered cemented carbide compositions described herein.

Sintered cemented carbide compositions and associated tooling can be formed by powder metallurgical techniques. For example, a method of producing a sintered cemented carbide cutting tool comprises providing a grade powder composition including a powder metallic binder component and hard particle component including tungsten carbide. The grade powder composition is formed into a green article, and the green article is sintered to provide the sintered cemented carbide cutting tool.

The grade powder composition, in some embodiments, is provided by mixing tungsten carbide particles and the powder metallic binder. The amount of powder metallic binder employed in the grade powder composition can be selected from Table I herein. In some embodiments, molybdenum carbide powder (Mo$_2$C) is combined with cobalt powder to provide the powder metallic binder. Mo$_2$C can be added to cobalt powder in an amount commensurate with providing a molybdenum content in the metallic binder selected from Table II herein. For example, Mo$_2$C can be present in an amount of 1 to 15 weight percent of the powder metallic binder. As described herein, one or more noble metals can also be part of the metallic binder. In such embodiments, powder noble metal can be added to the powder cobalt and powder Mo$_2$C.

The resulting mixture comprising of tungsten carbide particles and powder metallic binder can be milled in a ball mill or attritor. Milling of the mixture can result in tungsten carbide particles being coated with powder metallic binder.

The grade powder is formed or consolidated into a green article in preparation for sintering. Any consolidation method can be employed not inconsistent with the objectives of the present invention. The grade powder, for example, can be molded, extruded or pressed into a green article. In several specific embodiments, the grade powder can be pill pressed or cold-isostatic pressed into the green article. The green article can take the form of a blank or can assume near-net shape form of the desired cutting element, including cutting insert, drill or endmill. In some embodiments, the green article is mechanically worked to provide the desired shape.

The green article is subsequently sintered to provide the cutting elements formed of sintered cemented carbide. The green article can be vacuum sintered or sintered under an argon or hydrogen/methane atmosphere. During vacuum sintering, the green part is placed in a vacuum furnace and sintered at temperatures of 1320° C. to 1500° C. In some embodiments, hot isostatic pressing (HIP) is added to the vacuum sintering process. Hot isostatic pressing can be administered as a post-sinter operation or during vacuum sintering yielding a sinter-HIP process. The resulting sintered cemented carbide exhibits wear resistance and fracture toughness values described above, including the values provided in Table III. In contrast to several prior methods, carbon addition is not required to control the carbon potential during the sintering operation.

During sintering or sinter-HIP of the grade powder composition, molybdenum is liberated from the carbide and forms a cubic solid solution phase with the cobalt. Formation of the Co—Mo cubic solid solution phase can deplete $Mo_2C$ to sufficiently low levels such that $Mo_2C$ is not detected in an XRD of the sintered cemented carbide composition. In some embodiments, $Mo_2C$ is not present in the sintered cemented carbide composition. Noble metal present in the grade powder also forms one or more solid solution phases with the cobalt. The cobalt-noble metal solid solution phase can exhibit a hexagonal crystalline structure.

These and other embodiments are further illustrates by the following non-limiting examples.

Example 1

Sintered Cemented Carbide Compositions

Grade powders having the compositional parameters provided in Table IV were produced by mixing WC, Co, $Mo_2C$, carbon and paraffin wax powders and ball milling for 24 hours to form a homogeneous powder blend. The powder slurry was dried in vacuum to remove heptane. The dried powders were consolidated into blanks using a compacting pressure of 20,000 psi and sintered in an over-pressure sintering furnace (sinter-HIP). The compacted or green parts were dewaxed under a $H_2$ flow of 75-200 SCFH between 200° C. and 450° C. A flow of $CH_4$ (0.5-5 SCFH) and $H_2$ (175-250 SCFH) was applied at 1000° C. for 200-250 minutes followed by sintering at a final temperature of 1400° C. for 75-100 minutes under an argon gas pressure of 250 psi. Test specimens were prepared from the sintered blanks and the fracture toughness and wear resistance were determined as described below.

TABLE IV

| | Grade Powder Compositions | | | | | | |
|---|---|---|---|---|---|---|---|
| Grade Powder | Composition | WC (g) | Co (g) | Ru (g) | Re (g) | $Mo_2C$ (g) | C (g) | wax (g) |
| 1 | WC—10.2Co—0.9Ru—0.9$Mo_2C$ | 880.00 | 102.00 | 9.00 | 0.00 | 9.00 | 0.29 | 20.40 |
| 2 | WC—11.9Co—1.05Ru—1.05$Mo_2C$ | 860.00 | 119.00 | 10.50 | 0.00 | 10.50 | 0.33 | 40.80 |
| 3 | WC—10.2Co—0.9Re—0.9$Mo_2C$ | 880.00 | 102.00 | 0.00 | 9.00 | 9.00 | 0.29 | 20.40 |
| 4 | WC—11.9Co—1.05Re—1.05$Mo_2C$ | 860.00 | 119.00 | 0.00 | 10.50 | 10.50 | 0.33 | 40.80 |
| 5 | WC—10.2Co—1.8$Mo_2C$ | 880.00 | 102.00 | 0.00 | 0.00 | 18.00 | 0.29 | 20.40 |
| 6 | WC—11.9Co—2.1$Mo_2C$ | 860.00 | 119.00 | 0.00 | 0.00 | 21.00 | 0.33 | 40.80 |

Properties of the sintered cemented carbide compositions are detailed in Table V.

TABLE V

| Sintered Cemented Carbide Properties | | | | | | |
|---|---|---|---|---|---|---|
| Sintered Cemented Carbide | Hardness (HRA) | Density (g/cm$^3$) | WC Grain Size (μm) | Coercivity ($O_e$) | Magnetic Saturation (gauss cm$^3$g$^{-1}$) | Porosity |
| 1 | 88.2 | 14.35 | 2.7 | 102 | 193.2 | A00B00C00 |
| 2 | 88.4 | 14.22 | 3.0 | 91 | 220.7 | A00B00C00 |
| 3 | 88.8 | 14.54 | 2.4 | 126 | 190.6 | A00B00C00 |
| 4 | 87.6 | 14.31 | 3.0 | 107 | 220.6 | A00B00C00 |
| 5 | 88.9 | 14.39 | 2.2 | 114 | 190.6 | A00B00C00 |
| 6 | 87.8 | 14.15 | 2.5 | 110 | 219.4 | A00B00C00 |

Optical micrographs of the sintered cemented carbides of Table V are provided in FIGS. 1-6 respectively. Additionally, XRDs of the sintered cemented carbides of Table V are provided in FIGS. 7-12. As illustrated in FIGS. 7-12, metallic binder of each sintered cemented carbide composition exhibited a cubic cobalt-molybdenum solid solution phase. Moreover, sintered cemented carbide compositions 1-4 also employed noble metal (Ru, Re) in the metallic binder phase. Both ruthenium and rhenium formed solid solution phases with cobalt, the Co—Ru and Co—Re exhibiting hexagonal crystal structure as evidenced in FIGS. 7-10.

The sintered cemented carbide compositions were subsequently tested for wear resistance and fracture toughness. Two wear tests and three fracture tests were performed for each sintered cemented carbide composition of Table V. Wear resistance values were determined according to ASTM B611, and fracture toughness values were determined according to ASTM B771. Results of the testing are provided in Tables VI and VII.

TABLE VI

Sintered Cemented Carbide Wear Resistance

| Sintered Cemented Carbide | Abrasion Resistance (mm³/rev) | | | Wear Number (cm⁻³) | | |
|---|---|---|---|---|---|---|
| | Test 1 | Test 2 | Average | Test 1 | Test 2 | Average |
| 1 | 0.135 | 0.132 | 0.133 | 7.42 | 7.59 | 7.50 |
| 2 | 0.167 | 0.170 | 0.169 | 5.98 | 5.87 | 5.92 |
| 3 | 0.143 | 0.142 | 0.142 | 7.01 | 7.06 | 7.04 |
| 4 | 0.185 | 0.193 | 0.189 | 5.39 | 5.18 | 5.29 |
| 5 | 0.137 | 0.138 | 0.138 | 7.29 | 7.18 | 7.23 |
| 6 | 0.190 | 0.175 | 0.182 | 5.27 | 5.72 | 5.49 |

TABLE VII

Sintered Cemented Carbide Fracture Toughness

| Sintered Cemented Carbide | $K_{ICSR}$ [ksi(in$^{1/2}$)] | | | |
|---|---|---|---|---|
| | Test 1 | Test 2 | Test 3 | Average |
| 1 | 13.97 | 13.68 | 13.67 | 13.67 |
| 2 | 14.49 | 14.53 | 14.37 | 14.46 |
| 3 | 13.61 | 13.70 | 13.95 | 13.75 |
| 4 | 14.64 | 14.40 | 14.68 | 14.57 |
| 5 | 13.85 | 14.05 | 13.85 | 13.92 |
| 6 | 14.58 | 14.70 | 14.63 | 14.64 |

Figure 13:
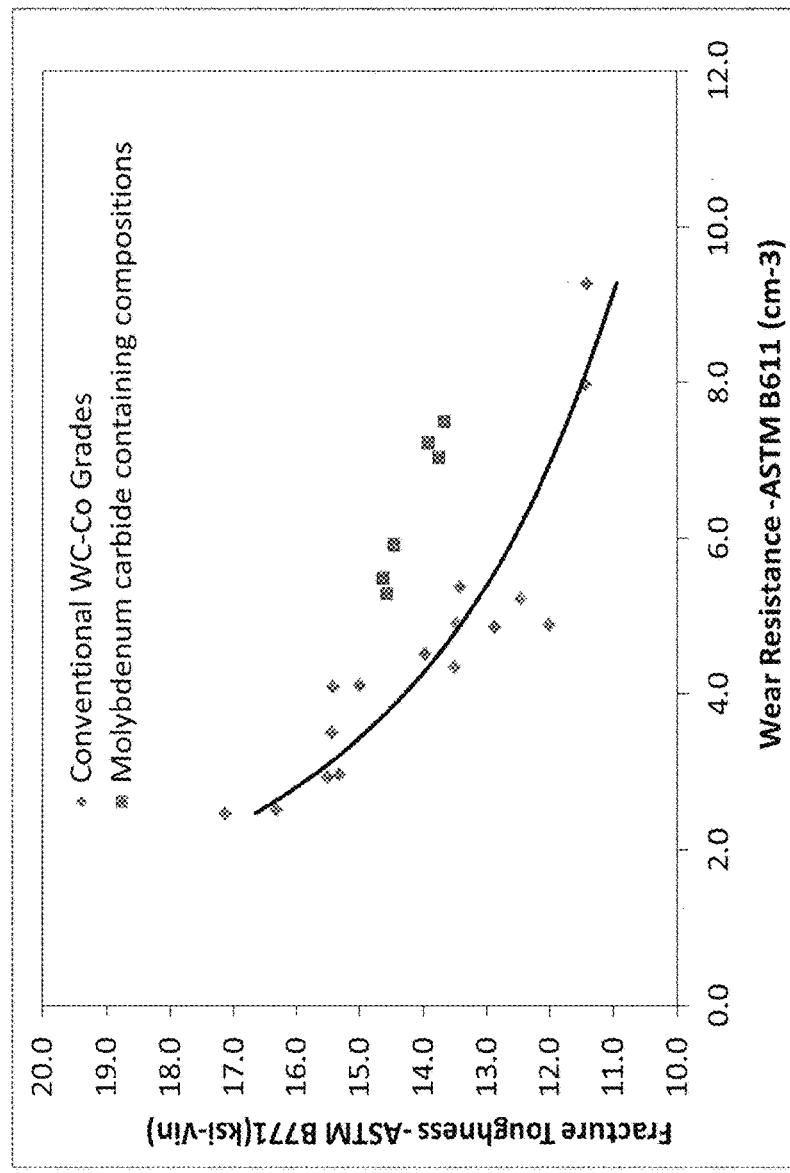
FIG. 13 is a plot of sintered cemented carbide fracture toughness against wear resistance.

As illustrated in FIG. 13, wear resistance and fracture toughness of the sintered cemented carbides 1-6 of the present Example were plotted against wear resistance and fracture toughness of prior commercial sintered cemented carbide grades. The sintered cemented carbide compositions of the present Example displayed enhanced wear resistance without significant losses in fracture toughness. In contrast, the prior commercial sintered cemented carbide grades exhibited dramatic reductions in fracture toughness in exchange for increased wear resistance.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A sintered cemented carbide composition comprising:
a hard particle phase including tungsten carbide; and
a cobalt-based metallic binder comprising a cubic cobalt-molybdenum solid solution phase.

2. The sintered cemented carbide composition of claim 1, wherein molybdenum is present in the cobalt-based metallic binder in an amount of 0.1 to 12 wt. %.

3. The sintered cemented carbide composition of claim 1, wherein a phase including molybdenum carbide is not present in an x-ray diffractogram of the sintered cemented carbide composition.

4. The sintered cemented carbide composition of claim 1, wherein the hard particle phase has an average grain size of 0.5 μm to 5 μm.

5. The sintered cemented carbide composition of claim 1, wherein the cobalt-based metallic binder further comprises a cobalt-noble metal solid solution phase.

6. The sintered cemented carbide of claim 5, wherein the noble-metal is selected from the group consisting of ruthenium, rhenium, rhodium, platinum, palladium and combinations thereof.

7. The sintered cemented carbide composition of claim 5, wherein the cobalt-noble metal solid solution phase has hexagonal crystalline structure.

8. The sintered cemented carbide composition of claim 7, wherein the noble metal is ruthenium or rhenium.

9. The sintered cemented carbide composition of claim 5, wherein the cobalt-noble metal solid solution phase is present in the cobalt-based metallic binder in an amount of 0.3 to 7 wt. %.

10. The sintered cemented carbide composition of claim 1, wherein the cobalt-based metallic binder is present in an amount of 10 to 15 weight percent of the sintered cemented carbide composition.

11. The sintered cemented carbide composition of claim 1 having fracture toughness greater than 13.5 ksi(in)$^{1/2}$ according to ASTM B771 Standard Test Method for Short Rod Fracture Toughness of Cemented Carbides.

12. The sintered cemented carbide composition of claim 1 having a wear number greater than 5.0 according to ASTM B611 Standard Method for Determining the High Stress Abrasion Resistance of Hard Materials.

13. The sintered cemented carbide composition of claim 11 having a wear number greater than 7.0 according to ASTM B611 Standard Method for Determining the High Stress Abrasion Resistance of Hard Materials.

14. The sintered cemented carbide composition of claim 1 having a wear number of 5 to 7 according to ASTM B611 Standard Method for Determining the High Stress Abrasion Resistance of Hard Materials and a fracture toughness of 14-16 ksi(in)$^{1/2}$ according to ASTM B771 Standard Test Method for Short Rod Fracture Toughness of Cemented Carbides.

15. The sintered cemented carbide composition of claim 1, wherein the article is free of eta phase.

16. The sintered cemented carbide composition of claim 1 having density of 14-15 g/cm³.

17. The sintered cemented carbide composition of claim 1 having the shape of a cutting element.

18. The sintered cemented carbide composition of claim 17, wherein the cutting element is a cutting insert of an earth-boring apparatus.

19. The sintered cemented carbide composition of claim 17, wherein the cutting element is a milling insert, end mill or drill.

20. The sintered cemented carbide composition of claim 1, wherein the sintered cemented carbide composition is substantially fully dense.

21. The sintered cemented carbide composition of claim 1 further comprising a polycrystalline diamond component sintered thereto.

22. The sintered cemented carbide composition of claim 21, wherein the polycrystalline diamond component forms a layer on a surface of the sintered cemented carbide composition.

23. A sintered cemented carbide composition comprising:
a hard particle phase including tungsten carbide; and
a cobalt-based metallic binder comprising a cubic cobalt-molybdenum solid solution phase, wherein the sintered cemented carbide composition has a magnetic saturation of about 190 gauss cm³/g to about 200 gauss cm³/g.

* * * * *